Figure 1:
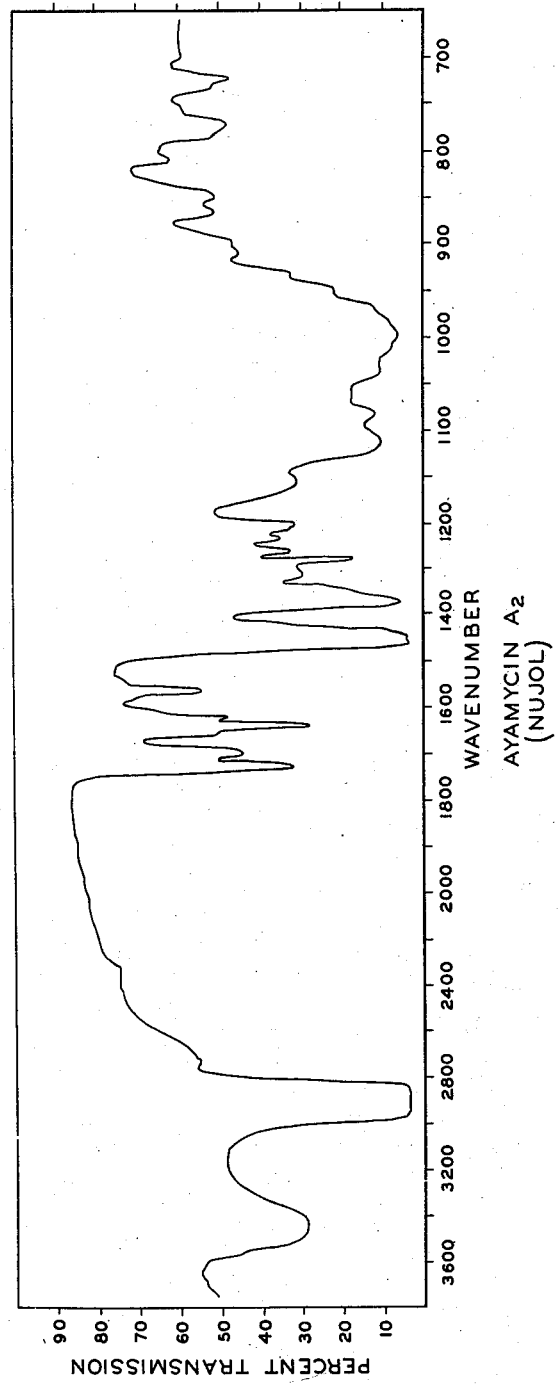

May 7, 1963 K. KATAGIRI 3,088,872
AYAMYCIN, A NEW ANTIBIOTIC AND PROCESS FOR
PRODUCING THE SAME
Filed May 20, 1960 2 Sheets-Sheet 2

$$\left[ \begin{array}{c} \text{AYAMYCIN } A_2 \\ \text{(IN 70\% METHANOLIC 0.1 NHCl)} \end{array} \right]$$

INVENTOR
Ken Katagiri
BY
Charles J. Elderkin
ATTORNEY 3,088,872
Patented May 7, 1963

3,088,872
AYAMYCIN, A NEW ANTIBIOTIC AND PROCESS FOR PRODUCING THE SAME
Ken Katagiri, New York, N.Y., assignor to Shionogi & Co., Ltd., Hyogo, Japan
Filed May 20, 1960, Ser. No. 30,664
Claims priority, application Japan May 22, 1959
7 Claims. (Cl. 167—65)

This invention relates to a new and useful antibiotic called ayamycin, and more particularly, to its production by fermentation, to methods for its recovery and concentration from crude solutions, such as fermentation broths, and to processes for its purification. The invention includes within its scope the antibiotic in dilute forms, as crude concentrates and in pure crystalline forms. These novel products are especially useful in combatting pathogenic microorganisms and inhibiting the growth of tumor. It should be noted in this connection, however, that the effectiveness of the antibiotic of the invention in the treatment of cancer in human beings has not, as yet, been proven clinically.

The new antibiotic is formed during the cultivation under controlled conditions of a new strain of microorganism known as Streptomyces flaveolus Number 0–80 in the collection of Shionogi Research Laboratory, Shionogi & Co., Ltd., Imafuku, Amagasaki-shi, Hyogo Prefecture, Japan, and on deposit with the American Type Culture Collection under the accession number ATCC No. 13811.

The culture was isolated from soil samples collected at Ayashi-machi, Miyago Prefecture, Japan.

The morphology of the culture was studied on asparagine glucose agar which was incubated at 27° C. for 10 days. The vegetative mycelium is light brownish gray. Grayish white aerial mycelium is velvety to cottony. Pale yellowish brown soluble pigment is produced. Conidiophores arise from an aerial mycelium in a form of tuft. The spore bearing hyphae forms open spiral. Spores are recognized to be cylindrical (0.9–1.1 by 1.3–1.5μ).

The cultural characteristics studied after 10 days' incubation at 27° C. on a various medium are as follows:

Synthetic agar—good, light brownish gray growth, small, velvety aerial mycelium is white to gray, with pale yellowish brown soluble pigment.
Glucose asparagine agar—good growth with brownish yellow tinge covered with velvety, light brownish gray aerial mycelium, with dull yellow soluble pigment.
Starch agar—good growth with brownish white tinge covered with small, velvety, white to gray aerial mycelium, with pale yellowish brown soluble pigment.
Yeast agar—good growth with brownish yellow tinge covered with white to gray aerial mycelium, with pale yellowish brown soluble pigment.
Nutrient agar—moderate, yellowish brown growth covered with scant, white cottony aerial mycelium, with pale brown soluble pigment.
Ca-malate glycerol agar—good growth with light brownish gray tinge covered with scant, white to gray aerial mycelium, with pale brown soluble pigment.
Blood agar—good growth with yellowish gray tinge, no aerial mycelium, no soluble pigment is produced.
Milk—colorless good growth with gray aerial mycelium, ring formation is found. Coagulation and peptonization of milk are weakly recognized.
Nutrient broth—ring formation of light brownish gray growth lacking aerial mycelium with small amount of submerged growth. Color of broth changes to brown.
Glucose broth—ring and pellicle of light brown growth are excellent with submerged growth. Color of broth changes to dull reddish orange.
Potato plug—heavy wrinkled, brownish gray growth with scant, white aerial mycelium. Color of plug is changed to pale yellow.
Carrot plug—heavy wrinkled, brownish gray growth, lacking aerial mycelium. Color of plug is changed to yellowish brown.
Gelatin stab—yellowish brown growth lacking aerial mycelium, with pale yellowish orange soluble pigment. Complete liquefaction in 8 days.

Physiological properties:

(1) Reduction of nitrate to nitrite is recognized in synthetic solution with 3% sucrose as a carbon source incubating at 27° C. for a week.
(2) Coagulation and peptonization of milk are weakly recognized at 37° C.
(3) Liquefaction of gelatin is exhibited to be complete in 8 days.
(4) Optimum temperature is 27° C. on a glucose asparagine agar.
(5) Chromogenic nature is revealed on organic medium.
(6) Tyrosinase is positive.
(7) Hydrolysis of starch is positive.

When the utilization of carbohydrate was examined according to Pridhanis method, 1-xylose, 1-arabinose, rhamnose fructose, d-galactose, sucrose, maltose, lactose, raffinose, d-mannitol, inositol, salicin, Na-acetate and Na-citrate were utilized by this strain, but sorbitol, dulcitol and Na-succinate not utilized.

From the characteristics described above, this strain shows some resemblance to both Streptomyces flaveolus and fulvissimus in Bergey's Manual of Determinative Bacteriology (7th edition). However, the strain differs from Str. fulvissimus in respect of a chromogenic nature and a spiral formation.

It is to be understood that for the production of ayamycin the present invention is not limited to Streptomyces flaveolus No. 0–80 (ATCC 13811). It is especially desired and intended to include the use of ayamycin-producing mutants or variants produced from the described organism by various means, such as X-radiation, ultra-violet radiation and nitrogen mustards.

In accordance with one aspect of my invention, the new antibiotic ayamycin is produced during cultivation of the microorganism Streptomyces flaveolus No. 0–80 (ATCC 13811) in an aqueous nutrient medium at a temperature of about 25 to about 30° C. under aerobic conditions. The composition of this nutrient medium may be varied over a very wide range. Essentially what is required is a carbon source, a nitrogen source and trace inorganic elements. As a carbon source there can be used sugars, starch, glycerol, glucose, etc. Suitable sources of nitrogen for the fermentation process include meat extracts, peptone, corn steep liquor, soybean meal, peanut meat, wheat gluten, yeast extracts, etc. As source of inorganic elements may be exampled mineral salts such as sodium chloride, potassium chloride, potassium phosphate, sodium nitrate, magnesium sulfate and the like. The nutrient medium is adjusted at pH about 7 in advance of inoculation of the microorganism. The maximum yields can be obtained within about 38 to about 64 hours of fermentation under optimum conditions of temperature and aeration at the rate of 1 volume of air per volume broth per minute. If excessive foaming is encountered during the fermentation, anti-foaming agents, such as vegetable oils, may be added to the fermentation medium. The pH of the fermentation tends to remain rather constant, but, if variations are encountered, a buffering agent, such as calcium carbonate may also be added to the medium.

After growth of the microorganism, the mycelium is removed from the fermentation broth by various standard equipment, such as filter-presses and centrifuges. Thereafter, the antibiotic ayamycin is recovered from the fermentation broth by a solvent extraction procedure. As the solvents for extraction may be preferably used chloroform, ethyl acetate, butyl acetate, amyl acetate, methyl isobutyl ketone, butanol and the like. The solvents such as benzene, toluene, carbon tetrachloride, ether and the like also may be used, but these are inferior to those in the point of the extraction ratio.

The antibiotic ayamycin is further purified, for instance, by shaking the solution of ayamycin in the organic solvent as described above with alkali bicarbonate solution. As the result of this operation, yellowish brown powder called ayamycin A is recovered from the organic solvent layer in the yield of 300 to 400 mg. per liter and reddish brown powder called ayamycin B is recovered from the water layer in the yield of 4 mg. per liter. Ayamycin A can be further separated to some components by absorption on alumina, silicate, silicic acid, $CaHPO_4$ or silica gel column with subsequent elution. Each of the components seems to have a similar chemical structure to one another, because of showing similar physical and chemical characters.

The main component of ayamycin A is called ayamycin $A_2$. Ayamycin $A_2$ is obtained in the yield of 60 to 80 mg. per liter. It is a neutral, yellow organic compound that is soluble in chloroform, dioxane, glacial acetic acid and N-NaOH, slightly soluble in acetone, methanol, ethanol, ethyl acetate, benzene and carbon tetrachloride and insoluble in petroleum ether and water. The compound is stable needles melting at about 203° C. The infrared spectrum and the ultraviolet spectrum are shown in the attached drawing, FIG. 1 and FIG. 2. The ultraviolet absorption spectrum is characterized by maxima in methanol $E_{1cm.}^{1\%}=273.2$ at 200 m$\mu$, $E_{1cm.}^{1\%}=41.9$ at 320 m$\mu$, and $E_{1cm.}^{1\%}=48.3$ at 430 m$\mu$, in 70% methanolic 0.1 N HCl $E_{1cm.}^{1\%}=273.2$ at 220 m$\mu$, $E_{1cm.}^{1\%}=39.0$ at 320 m$\mu$, and $E_{1cm.}^{1\%}=48.3$ at 430 m$\mu$, and in 70% methanolic 0.1 N NaOH $E_{1cm.}^{1\%}=89.0$ at 290 m$\mu$, $E_{1cm.}^{1\%}=41.9$ at 400 m$\mu$ and $E_{1cm.}^{1\%}=61.0$ at 530 m$\mu$.

The infrared absorption spectrum in Nujol shows the following bands: 3425, 1724, 1698, 1642, 1621, 1563, 1304, 1280, 1261, 1232, 1203, 1155, 1130, 1083, 1004, 954, 935, 914, 867, 861, 812, 768 and 724 cm.$^{-1}$. When dissolved in dioxane (c. 0.835%) its optical rotation is $[\alpha]_D^{23°}=-39.8°\pm2°$.

A sample of ayamycin $A_2$ which had been crystallized from chloroform-benzene, was analyzed and found to be composed of the following elements in the proportions by weight specified:

| | |
|---|---|
| Carbon | 62.29 |
| Hydrogen | 7.09 |
| Oxygen | 30.32 |

The molecular weight of ayamycin $A_2$ as determined by Rast method was found to be 560.5. The above analyses correspond to the probable empirical formula $C_{28}H_{38}O_{10}$ for ayamycin $A_2$.

In concentrated sulphuric acid, ayamycin $A_2$ acquires a clear violet color. It acquires a purple color in magnesium acetate solution. It acquires a brown color in ferric chloride solution and decolorizes the color of potassium permanganate aqueous solution. The yellowish color of ayamycin $A_2$ by 0.1 N HCl, changes into blue with 0.1 N NaOH, and the blue color in alkaline solution is decolorized by hydrogen peroxide. The Fehling, Molisch, biuret and ninhydrin reactions are negative.

Heating at 100° C. for 10 minutes at pH 7.0, it does not decrease the biological activity, but heating at pH 2.0 or 9.0 reduced the activity. The activity is not decreased when dissolved in methanol and kept for 140 hours at room temperature, however, after exposure to direct sun light for 3 hours the activity is reduced to 50%, and after 24 hours, perfectly inactivated.

Antibiotic ayamycin is clearly distinguished from other antibiotics by its properties as described above.

Ayamycin $A_2$ shows activity against a variety of microorganisms and the following table illustrates the antibiotic spectrum of ayamycin $A_2$ through tests performed against a variety of such microorganisms.

| Test organisms: | Minimal inhibitory concentration, mcg. per ml. |
|---|---|
| Bacillus anthracis | 5 |
| Bacillus subtilis | 100 |
| Staphylococcus aureus, 209P | >100 |
| Sartina lutea | 50 |
| Shigella dysenteriae, Shiga | >100 |
| Escherichia coli | >100 |
| Pseudomonas aeruginosa | >100 |
| Klebsiella pneumoniae | >100 |

Accordingly, ayamycin $A_2$ is useful in processes where it is desired to inhibit the growth of microorganisms. It is useful for sterilizing equipment, for example, surgical instruments, and for the purposes of classifying organisms. It is also useful in obtaining pure cultures of single organisms where a susceptible organism may be separated from a resistant one.

Although the antibiotic activity of ayamycin $A_2$ is as aforesaid, it should be especially noted that ayamycin $A_2$ shows cytostatic (anti-tumor) activity. Namely, it showed the inhibiting activity of the growth of HeLa-Cells at the concentration of 0.4 mcg. per ml. And also, it was administered intraperitoneally to the mice implanted Ehrlich ascites tumor at the each dosage of 20 mg. per kg. of body weight for 2 days and after 22 days it was observed that 80 percent of the number of the test mice survived. The intravenous toxicity tests with ayamycin $A_2$ show that the LD50 in mice is 22 mg. per kg. of body weight.

The following examples are given solely for the purpose of illustration and are not to be construed as limitations of this invention, many variations of which are possible.

*Example*

A nutrient medium was prepared from the following materials:

| | G. per liter |
|---|---|
| Glycerol | 20 |
| Corn starch | 20 |
| Polypeptone | 5 |
| Meat extracts | 5 |
| Sodium chloride | 3 |
| Calcium carbonate | 3.5 |

After adjusting the mixture to a pH of 7, steam was passed through the mixture to sterilize the same. Then, the nutrient medium was inoculated with the inoculum prepared by incubating *Streptomyces flaveolus* No. 0–80 (ATCC 13811) for 24 hours with shaking. The microorganism was cultivated under aeration for a period of 48 hours, controlling at a temperature of 27 to 29° C. The fermentation broth, containing antibiotic in the concentration of 400 mg. per liter, was filtered to remove the mycelium. The filtrate broth was adjusted to a pH of 7.2 and twice extracted with a quarter volume of ethyl acetate. The combined ethyl acetate extracts were twice extracted with a quarter volume of 3% sodium bicarbonate aqueous solution.

The combined sodium bicarbonate aqueous solution extracts were adjusted to a pH of 3.4 and extracted with ethyl acetate. The ethyl acetate extract was concentrated under reduced pressure to a small volume. By precipitating the resulting ethyl acetate extract with petroleum ether, ayamycin B was obtained in the yield of 4 mg. per liter of the fermentation broth.

The ethyl acetate extract, leaving after the extraction with 3% sodium bicarbonate aqueous solution, was concentrated under reduced pressure to a small volume. By precipitating the resulting ethyl acetate extract with petroleum ether, ayamycin A was obtained as yellow powder in the yield of 300 to 400 mg. per liter of the fermentation broth.

2 g. of ayamycin A thus obtained were heated with 220 ml. of benzene and filtered. The filtrate was washed with the water adjusted with sodium bicarbonate to a pH of 7.4 to 7.6. The benzene layer was concentrated under reduced pressure to a small volume and then poured on a column of alumina treated in advance with conc. nitric acid, with subsequent elution with benzene. The combined eluates were concentrated under reduced pressure and set aside at room temperature to crystallize out 440 mg. of crude crystals. To the solution of the crude crystals in chloroform was added benzene and the mixture was set aside in a refrigerator for a short time to afford ayamycin $A_2$ as yellow needles.

Having thus described the subject matter of my invention, what it is desired to secure by Letters Patent is:

1. A process for producing a new antibiotic, ayamycin, which comprises cultivating the microorganism *Streptomyces flaveolus* ATCC 13811 in an aqueous nutrient medium under submerged aerobic conditions.

2. A process for producing a new antibiotic, ayamycin, which comprises cultivating the microorganism *Streptomyces flaveolus* ATCC 13811 in an aqueous nutrient medium under submerged aerobic conditions at a temperature of from about 25 to about 30° C. for a period of from about 38 to about 64 hours.

3. A process for producing a new antibiotic, ayamycin, which comprises cultivating the microorganism *Streptomyces flaveolus* ATCC 13811 in an aqueous nutrient medium under submerged aerobic conditions and recovering ayamycin from the fermentation broth.

4. A process for producing a new antibiotic, ayamycin, which comprises cultivating the microorganism *Streptomyces flaveolus* ATCC 13811 in an aqueous nutrient medium under submerged aerobic conditions, filtering the fermentation broth and extracting the filtrate broth with a water-immiscible organic solvent at a pH of about 7.2.

5. A process for producing a new antibiotic, ayamycin, which comprises cultivating the microorganism *Streptomyces flaveolus* ATCC 13811 in an aqueous nutrient medium under submerged aerobic conditions, filtering the fermentation broth, extracting the filtrate broth with a water-immiscible organic solvent at a pH of about 7.2 and shaking the resulting extract with alkaline water to recover ayamycin A from the organic solvent layer and ayamycin B from the water layer.

6. A process for producing a new antibiotic, ayamycin, which comprises cultivating the microorganism *Streptomyces flaveolus* ATCC 13811 in an aqueous nutrient medium under submerged aerobic conditions, filtering the fermentation broth, extracting the filtrate broth with a water-immiscible organic solvent at a pH of about 7.2, shaking the resulting extract with alkalized water to recover ayamycin A from the organic solvent layer and chromatographed thus-obtained ayamycin A with subsequent elution to isolate ayamycin $A_2$.

Figure 2:
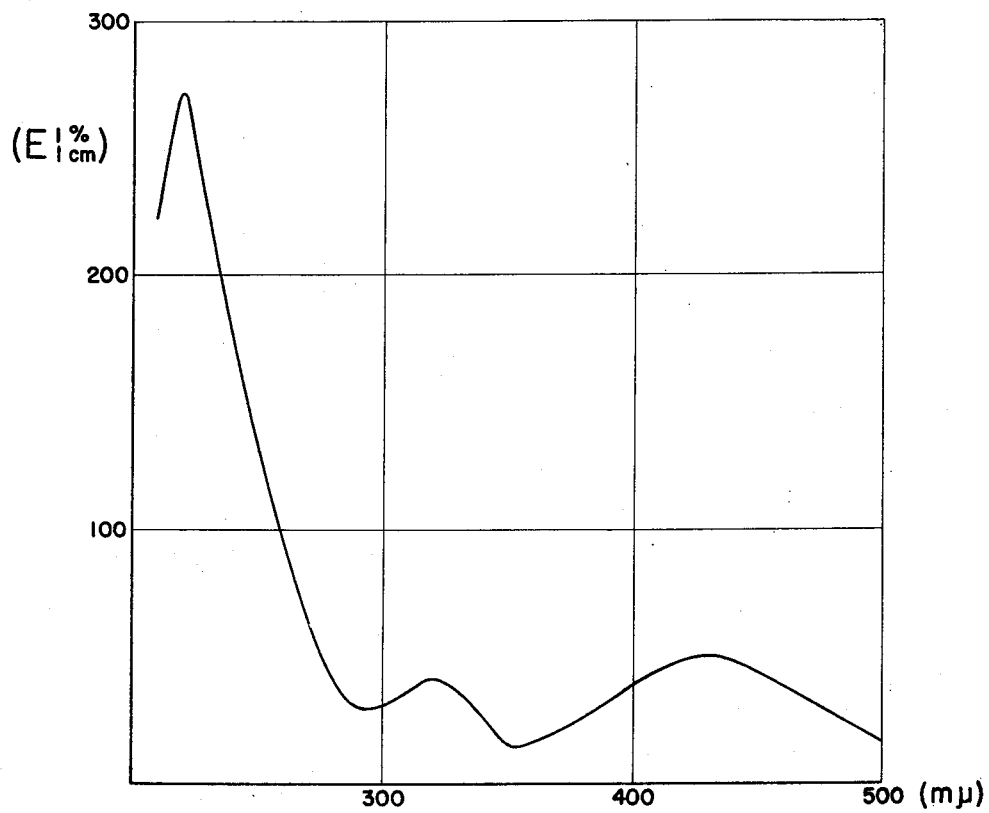

7. The antibiotic, ayamycin $A_2$, effective in inhibiting the growth of tumor, said antibiotic being a neutral compound containing only the elements carbon, hydrogen and oxygen in substantially the following proportions by weight:

| | Percent |
|---|---|
| Carbon | 62.29 |
| Hydrogen | 7.09 |
| Oxygen | 30.32 | being yellow crystals melting at 203° C., having a molecular weight of 560.5, a molecular formula of $C_{28}H_{38}O_{10}$, an optical rotation of $[\alpha]_D^{23°} = -39.8° \pm 2°$ when dissolved in dioxane (C. 0.835%), and showing the infrared spectrum and the ultra-violet spectrum as in the attached drawings, FIG. 1 and FIG. 2, respectively.

References Cited in the file of this patent

Waksman: Actinomycete and Their Antibiotics, pub. 1953 by Williams and Wilkins, pages 43 and 44. (Copy in Div. 43.)

Corbaz et al.: Archiv. für Mikrobiologie, vol. 26, pages 192–208, page 201 is especially pertinent, 1957.